UNITED STATES PATENT OFFICE.

ISAAC P. WENDELL, OF PHILADELPHIA, PENNSYLVANIA, ASSIGNOR TO THEODORE P. MATTHEWS, OF SAME PLACE.

ANTI-FRICTION COMPOSITION.

SPECIFICATION forming part of Letters Patent No. 368,635, dated August 23, 1887.

Application filed December 14, 1886. Serial No. 221,556. (No specimens.)

*To all whom it may concern:*

Be it known that I, ISAAC P. WENDELL, a citizen of the United States, residing at Philadelphia, in the county of Philadelphia and State of Pennsylvania, have invented a new and useful Improvement in Compositions of Matter for Manufacturing Washers, Gaskets, and the like, of which the following is a specification.

My invention relates to that class of compositions of matter especially adapted for use in manufacturing therefrom washers, gaskets, and the like.

The object of my invention is to provide an inexpensive material having the proper toughness and pliability for such use, and which shall also be more or less self-lubricating.

My invention consists of a combination of ingredients assembled in the manner hereinafter set forth.

In preparing my improved washer and gasket material I first make a glue solution combined with resinous matter by dissolving one ounce of gum-sandarac and one ounce of gum-mastic in one pint of alcohol and afterward adding thereto one ounce of spirits of turpentine. When these ingredients are well incorporated, I take one part thereof and add thereto one part of a solution of glue made by dissolving one-fourth of a pound of ordinary glue of commerce in one pint of water, and I then thoroughly mix together the resinous solution and the glue solution by heating them nearly to the boiling-point and stirring. I then prepare a solution of india-rubber by taking the ordinary rubber of commerce and adding thereto a sufficient quantity of benzole or other suitable solvent to completely dissolve the same. I then mix well together eight parts, by measure, of the glue solution combined with resinous matter; eight parts, by measure, of the rubber solution; one part, by measure, of glycerine; and after these are thoroughly mixed I add four parts, by measure, of powdered asbestus; twelve parts, by measure, of fibrous asbestus, kneading and working the whole together until the mass assumes the consistence of a moderately-stiff paste, which I then mold, roll into sheets, or otherwise manipulate into such form as may be desired, and dry, either with or without the use of artificial heat and with or without subjecting it to pressure.

If toughness is especially required, I add to the ingredients already enumerated four parts, by measure, of chloride of zinc, adding the same at any time after the glue solution, rubber solution, and glycerine have been well mixed together. I also employ sixteen parts, by measure, of talc well pulverized, as a substitute for the powdered and fibrous asbestus and in lieu thereof, the one substance being the equivalent of the other as a body material for the purposes of this composition.

I do not confine myself strictly to the proportions named, as I have found that all of them may be varied within certain limits and yet produce an effective material for the manufacture of tough, pliable, and self-lubricating washers and gaskets; nor is it essential to make the resinous glue solution precisely as described; but I have found in practice that the best results are secured by the combination in the proportions above set forth.

What I claim, and desire to secure by Letters Patent, is—

1. A composition of matter consisting of rubber, glue, resinous matter, glycerine, and a mineral substance, as asbestus, substantially as set forth.

2. A composition of matter consisting of rubber, glue, resinous matter, glycerine, chloride of zinc, and a mineral substance, as asbestus, substantially as described.

3. A composition of matter consisting of rubber, glue, resinous matter, glycerine, and asbestus, both powdered and fibrous, substantially as described.

4. A composition of matter consisting of rubber, glue, resinous matter, glycerine, asbestus, both powdered and fibrous, and chloride of zinc, substantially as set forth.

In testimony whereof I have signed my name to this specification in the presence of two subscribing witnesses.

ISAAC P. WENDELL.

Witnesses;
HAROLD TYNDALE,
W. G. WENDELL.